United States Patent
Charrier et al.

(10) Patent No.: US 11,578,664 B2
(45) Date of Patent: Feb. 14, 2023

(54) OIL COLLECTOR FOR A MECHANICAL REDUCTION GEAR OF AN AIRCRAFT TURBOMACHINE

(71) Applicant: SAFRAN TRANSMISSION SYSTEMS, Colombes (FR)

(72) Inventors: Mathieu Jean Charrier, Moissy-Cramayel (FR); Boris Pierre Marcel Morelli, Moissy-Cramayel (FR); Jean-Pierre Serey, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 337 days.

(21) Appl. No.: 16/928,434

(22) Filed: Jul. 14, 2020

(65) Prior Publication Data
US 2021/0079844 A1 Mar. 18, 2021

(30) Foreign Application Priority Data

Jul. 16, 2019 (FR) ...................................... 1908011

(51) Int. Cl.
*F16H 57/04* (2010.01)
*F02C 7/36* (2006.01)
(Continued)

(52) U.S. Cl.
CPC .................. *F02C 7/36* (2013.01); *F02C 7/06* (2013.01); *F16H 57/0427* (2013.01);
(Continued)

(58) Field of Classification Search
CPC .......... F02C 7/36; F02C 7/06; F16H 57/0427; F16H 57/0479; F16H 57/0486;
(Continued)

(56) References Cited

U.S. PATENT DOCUMENTS 5,851,163 A * 12/1998 Kawase .............. F16H 57/0487
475/183
8,777,792 B2 * 7/2014 Imai ...................... F16H 57/045
475/159
(Continued)

FOREIGN PATENT DOCUMENTS

EP 2559913 A1 2/2013
EP 2719927 A1 4/2014
(Continued)

OTHER PUBLICATIONS

Preliminary Research Report received for French Application No. 1908011, dated Mar. 2, 2020, 3 pages (1 page of French Translation Cover Sheet and 2 pages of original document).

*Primary Examiner* — Justin Holmes
(74) *Attorney, Agent, or Firm* — Womble Bond Dickinson (US) LLP

(57) ABSTRACT

An oil collector for a mechanical reduction gear of a turbomachine, in particular for an aircraft, the reduction gear including a body having two opposite lateral faces configured to extend in part around planet gears of the reduction gear, the collector further including an internal oil circulation cavity connected firstly to oil inlets located on the faces, and on the other hand to at least one oil outlet, characterised in that at least one of the faces comprises includes columns and rows of several inlets each having a recess with a progressively increasing cross-section, each recess being delimited by walls, at least some of the walls having a hydrodynamic profile.

14 Claims, 5 Drawing Sheets

(51) Int. Cl.
 *F02C 7/06* (2006.01)
 *F16H 57/08* (2006.01)
(52) U.S. Cl.
 CPC ..... *F16H 57/0479* (2013.01); *F16H 57/0486* (2013.01); *F16H 57/082* (2013.01); *F05D 2220/323* (2013.01); *F05D 2260/40311* (2013.01); *F05D 2260/98* (2013.01)
(58) Field of Classification Search
 CPC ...... F16H 57/082; F16H 57/0446; F16H 1/32; F16H 57/021; F16H 57/023; F16H 57/0417; F16H 57/042; F16H 57/045; F16H 57/0457; F16H 2001/327; F05D 2220/323; F05D 2260/40311; F05D 2260/98; F02K 3/06
 See application file for complete search history.

(56) References Cited

U.S. PATENT DOCUMENTS

| | | | | |
|---|---|---|---|---|
| 9,121,491 | B2* | 9/2015 | Hancox | F16H 57/0486 |
| 9,764,592 | B1* | 9/2017 | Hays | F16H 1/10 |
| 2003/0232694 | A1* | 12/2003 | Buhrke | F16H 57/0427 |
| | | | | 475/346 |
| 2013/0225353 | A1 | 8/2013 | Gallet et al. | |

FOREIGN PATENT DOCUMENTS

| | | |
|---|---|---|
| FR | 2987416 A1 | 8/2013 |
| FR | 3041054 A1 | 3/2017 |
| WO | 2010/092263 A1 | 8/2010 |

* cited by examiner

OIL COLLECTOR FOR A MECHANICAL REDUCTION GEAR OF AN AIRCRAFT TURBOMACHINE

TECHNICAL FIELD OF THE INVENTION

The present invention concerns an oil collector for a mechanical reduction gear of a turbomachine, in particular for an aircraft.

BACKGROUND

The background comprises in particular documents WO-A1-2010/092263, FR-A1-2 987 416, FR-A1-3 041 054, EP-A1-2 719 927 and EP-A1-2 559 913.

The role of a mechanical reduction gear is to change the speed and torque ratio between the input and output shafts of a mechanical system.

The new generations of dual-flow turbomachines, in particular those with high dilution ratio, comprise a mechanical reduction gear to drive the shaft of a fan. Usually, the purpose of the reduction gear is to transform the so-called fast rotation speed of the shaft of a power turbine into a slower rotation speed for the shaft driving the fan.

Such a reduction gear comprises a central pinion, called the sun gear, a ring gear and pinions called the planet gears, which are meshed between the sun gear and the ring gear. The planet gears are held by a frame called a planet carrier. The sun gear, the ring gear and the planet carrier are planetary gears because their axes of revolution coincide with the longitudinal axis X of the turbomachine. The planet gears each have a different axis of revolution and are equally distributed on the same operating diameter around the axis of the planetary gears. These axes are parallel to the longitudinal axis X.

There are several reduction gear architectures. In the prior art of the dual-flow turbomachines, the reduction gears are of the planetary or epicyclic type. In other similar applications, there are so-called differential or "compound" architectures.

- on a planetary reduction gear, the planet carrier is fixed and the ring gear constitutes the output shaft of the device which rotates in the opposite direction to that of the sun gear.
- on an epicyclic reduction gear, the ring gear is fixed and the planet carrier constitutes the output shaft of the device which rotates in the same direction as the sun gear.
- on a differential reduction gear, no element is fixed in rotation. The ring gear rotates in the opposite direction to the sun gear and the planet carrier.

The reduction gears can consist of one or more meshing stages. This meshing is achieved in various ways such as by contact, by friction or by magnetic fields. There are several types of contact meshing, such as straight or herringbone toothings.

The meshings of the reduction gears are lubricated by oil. The lubricating oil is heated during operation because it absorbs the heat energy generated by the reduction gear. The temperature of the oil has an impact on its viscosity and lubrication efficiency. It is therefore important to discharge the hot oil after the reduction gear has been lubricated in order to recycle it.

However, once lubricated, the planet gears of the reduction gear project the hot oil by centrifugation to the adjacent planet gears. This oil recirculation has several drawbacks: increase of the ventilation losses of the reduction gear, increase of the temperature of the planet gears, reduction of the seizure margin, increase in the oil outlet temperature for sizing the exchangers, higher air-to-oil ratio, higher oil consumption which reduces the low oil level in the oil tank, etc.

A solution to this problem is to place deflectors or oil collectors between the planet gears. The purpose of the deflectors is to divert the projected oil to oil discharging and recycling means. The purpose of the oil collectors is to collect the projected oil and to convey it to the oil discharging and recycling means.

A reduction gear oil collector usually comprises a body comprising two opposite lateral faces configured to extend partly around the planet gears of the reduction gear, the collector further comprising an internal oil circulation cavity connected on the one hand to oil inlets located on the lateral faces, and on the other hand to at least an oil outlet.

This collector must drain the oil efficiently, otherwise the space between the planet gears and the collector will become saturated with oil. This results in the splashing of the planet gears and has the same negative consequences as listed above.

The present invention proposes to optimize the oil recovery by a collector thanks to an improvement which is simple, efficient and economical.

SUMMARY OF THE INVENTION

The invention concerns an oil collector for a mechanical reduction gear of a turbomachine, in particular for an aircraft, the reduction gear comprising a body comprising two opposite lateral faces each configured to extend in part around a planet gear of the reduction gear, the collector further comprising an internal oil circulation cavity connected on the one hand to oil inlets located on said faces, and on the other hand to at least one oil outlet, characterized in that at least one of said faces comprises columns and rows of several inlets each having a recess with a progressively increasing cross-section, each recess being delimited by walls, and wherein at least some of said walls have a NACA type hydrodynamic profile.

The lubricating oil of the planet gears is sprayed by centrifugation onto the lateral faces of the collector comprising the oil inlets. These inlets or recesses with an increasing passage section make it possible to limit the pressure losses, the drag and the disturbance of the oil flow towards the collector cavity. A relatively large quantity of oil can be simultaneously conveyed to the cavity due to the arrangement of these inlets in columns and rows on the faces of the collector. The oil inlets are thus organised in a matrix or network capturing a maximum amount of oil projected by the planet gears.

According to the invention, at least some of the said walls have a hydrodynamic profile; a wall with a hydrodynamic profile is a wall which is designed to minimize disturbances in the flow of a fluid on this wall; an example of a wall with a hydrodynamic profile is a wall with a NACA profile; in the present application, NACA profile means a hydrodynamic surface area configured to ensure oil flow by limiting pressure losses and drag; for example, this profile or surface area has no edges and comprises rounded portions ensuring undisturbed oil flow; the profile may for example comprise a ramp with a small slope, preferably less than 20%.

The collector according to the invention may comprise one or more of the following features, taken in isolation from each other, or in combination with each other:
  the number of rows is greater than or equal to three;
  the number of columns is greater than or equal to five, and
    preferably greater than or equal to eight;

the inlets of one row are offset in the direction of the column arrangement with respect to the inlets of at least one of the adjacent rows;

the inlets of the even rows are aligned with each other in the direction of the column arrangement, and the inlets of the odd rows are aligned with each other in the direction of the column arrangement, each recess is delimited by walls;

one of said walls comprises an oil passage window inside said cavity;

the walls of the recess comprise two facing lateral walls and a ramp extending between the lateral walls and configured to convey the oil from the face to a bottom wall comprising said window;

the lateral walls diverge from each other towards said window so that the recess has a generally flared shape towards said window;

the lateral walls each have an evolutionary shape that is non-planar and has no edges.

the inlets located on each of the faces occupy a surface area representing more than 50% of the total surface area of this face, each of the two opposite lateral faces comprises the columns and rows of several inlets each having a recess of progressively increasing cross-section.

The present invention also relates to a mechanical reduction gear of a turbomachine, in particular for an aircraft, comprising a sun gear, a ring gear extending around the sun gear, and planet gears meshed with the sun gear and the ring gear, collectors as described above being disposed between the planet gears.

The invention furthermore concerns a turbomachine, in particular for an aircraft, comprising a mechanical reduction gear as described above.

BRIEF DESCRIPTION OF THE FIGURES

Other features and advantages will be apparent from the following description of a non-exhaustive embodiment of the invention with reference to the annexed drawings on which.

DETAILED DESCRIPTION OF THE INVENTION

Figure 1:
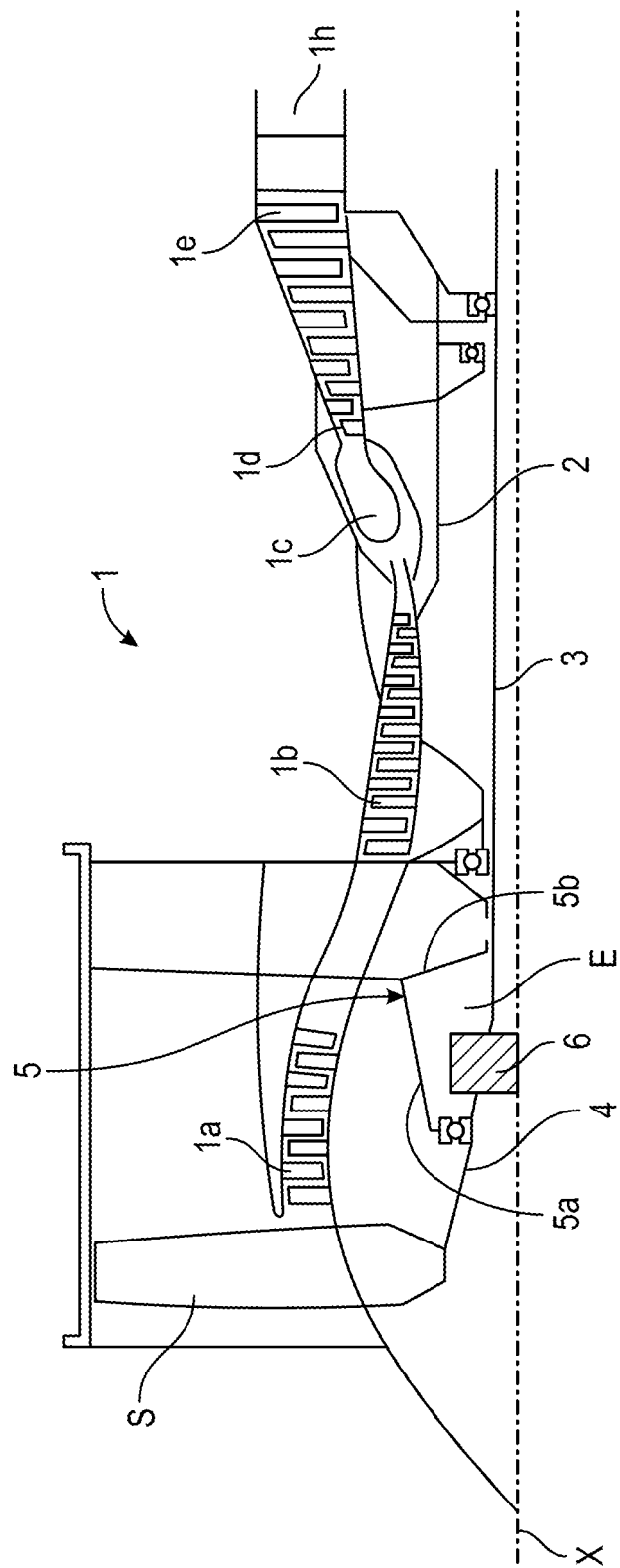
FIG. 1 is a schematic axial section view of a turbomachine using the invention.

FIG. 1 describes a turbomachine 1 which conventionally comprises a fan S, a low-pressure compressor 1a, a high-pressure compressor 1b , an annular combustion chamber 1c, a high-pressure turbine 1d , a low-pressure turbine 1e and an exhaust nozzle 1h . The high-pressure compressor 1b and the high-pressure turbine 1d are connected by a high-pressure shaft 2 and form with it a high-pressure (HP) body. The low-pressure compressor 1a and the low-pressure turbine 1e are connected by a low-pressure shaft 3 and form with it a low-pressure body (LP).

The fan S is driven by a fan shaft 4 which is driven to the LP shaft 3 by means of a reduction gear 6. This reduction gear 6 is usually of the planetary or epicyclic type.

Although the following description refers to a planetary or epicyclic reduction gear, it also applies to a mechanical differential in which the three components, namely the planet carrier, the ring gear and the sun gear, are rotatable, the speed of rotation of one of these components depending in particular on the speed difference of the other two components.

The reduction gear 6 is positioned in the upstream part of the turbomachine. A fixed structure comprising schematically, here, an upstream part 5a and a downstream part 5b which makes up the engine casing or stator 5 is arranged so as to form an enclosure E surrounding the reduction gear 6. Here, this enclosure E is closed upstream by seals at a bearing level allowing the fan shaft 4 to pass through, and downstream by seals at the level of the LP shaft 3.

Figure 2:
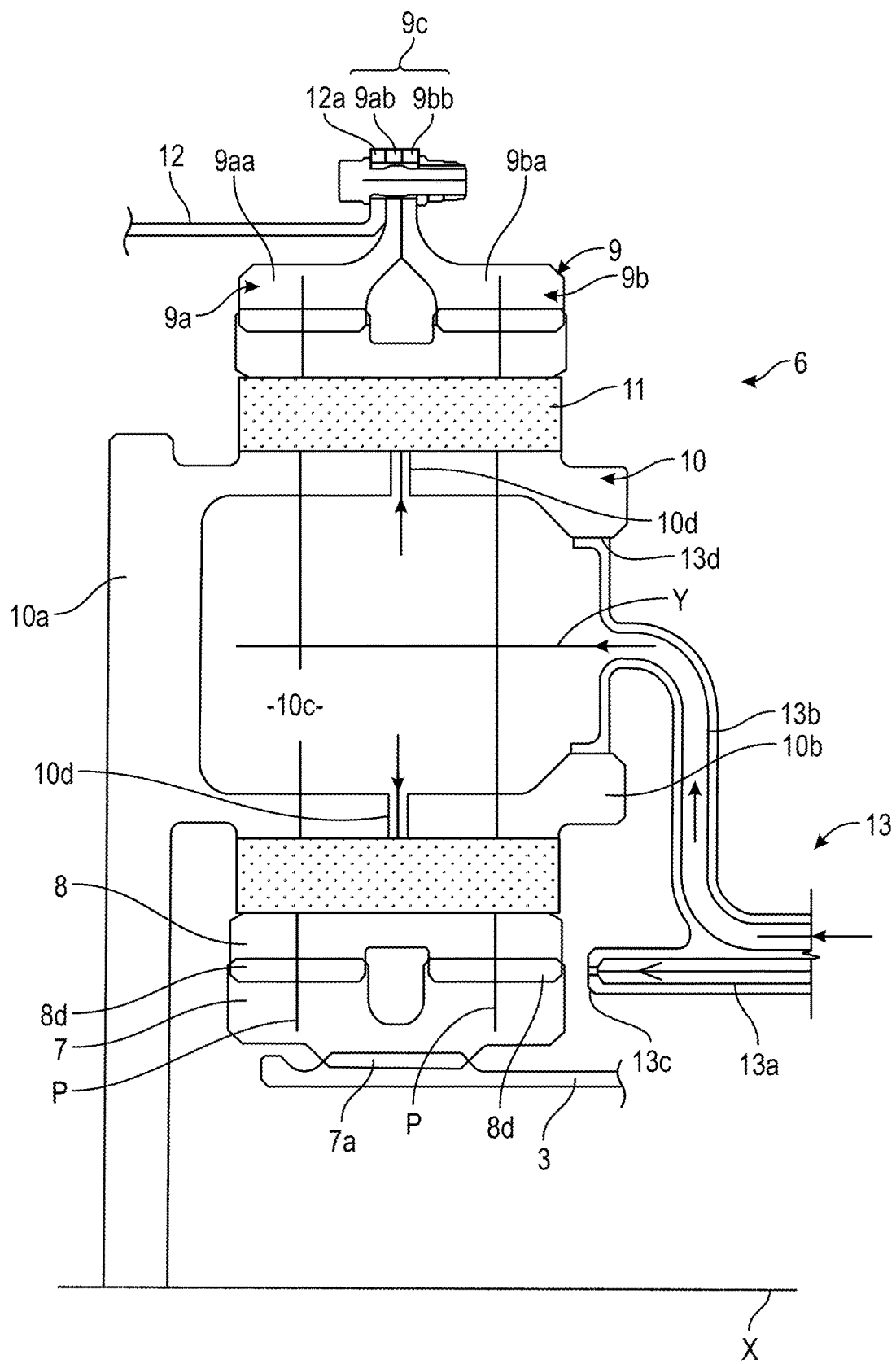
FIG. 2 is a partial schematic axial section view of a mechanical reduction gear.

FIG. 2 shows a reduction gear 6 which can take the form of different architectures depending on whether some parts are fixed or rotatable. As an input, the reduction gear 6 is connected to LP shaft 3, for example via internal splines 7a . Thus, the LP shaft 3 drives a planetary pinion called the sun gear 7. Classically, the sun gear 7, whose axis of rotation is the same as that of the turbomachine X, drives a series of pinions called planet gears 8, which are evenly distributed on the same diameter around the axis X of rotation. This diameter is equal to twice the operating centre distance between the sun gear 7 and the planet gears 8. The number of planet gears 8 is generally defined between three and seven for this type of application.

All planet gears 8 are held by a frame called planet carrier 10. Each planet gear 8 rotates around its own axis Y and meshes with the ring gear 9.

On the output we have:

In an epicyclic configuration, all planet gears 8 rotate the planet carrier 10 around the axis X of the turbomachine. The ring gear is fixed to the engine casing or stator 5 via a ring gear carrier 12 and the planet carrier 10 is fixed to the fan shaft 4.

in a planetary configuration, all planet gear 8 are held by a planet carrier 10 which is fixed to the engine casing or stator 5. Each planet gear drives the ring gear which is connected to the fan shaft 4 via a ring gear carrier 12.

Each planet gear 8 is freely rotatably mounted by means of a bearing 11, e.g. a rolling or hydrostatic bearing. Each bearing 11 is mounted on one of the axes 10b of the planet carrier 10 and all axes are positioned relative to each other by means of one or more structural frames 10a of the planet carrier 10. There is a number of axes 10b and bearings 11 equal to the number of planet gears. For operational, mounting, manufacturing, testing, repair or spare parts reasons the axes 10b and the frame 10a can be separated into several parts.

For the same reasons as mentioned above, the toothing 8d of a reduction gear can be divided into several helices, each with a median plane P. In our example, we show in detail the operation of a multi-helix reduction gear with a ring gear separated into two half-ring gear:

an upstream half-ring gear 9a consisting of a rim 9aa and a fastening half-flange 9ab. On the rim 9aa is located the upstream helix of the toothing of the reduction gear. This upstream helix meshes with that of the planet gear 8 which meshes with that of the sun gear 7.

a downstream half-ring gear 9b consisting of a rim 9ba and a fastening half-flange 9bb. On the rim 9ba is the downstream helix of the toothing of the reduction gear. This downstream helix meshes with that of the planet gear 8 which meshes with that of the sun gear 7.

If the helix widths vary between the sun gear 7, the planet gears 8 and the ring gear 9 because of toothing overlaps, they are all centred on a median plane P for the upstream helixes and on another median plane P for the downstream helixes. In the other figures, in the case of a double row roller bearing, each row of rolling elements is also centred on two median planes.

The fastening half flange 9ab of the upstream ring gear 9a and the fastening half flange 9bb of the downstream ring gear 9b form the fastening flange 9c of the ring gear.

The ring gear 9 is fixed to a ring gear carrier by assembling the fastening flange 9c of the ring gear and the fastening flange 12a of the ring gear carrier using a bolted assembly for example.

Figure 3:
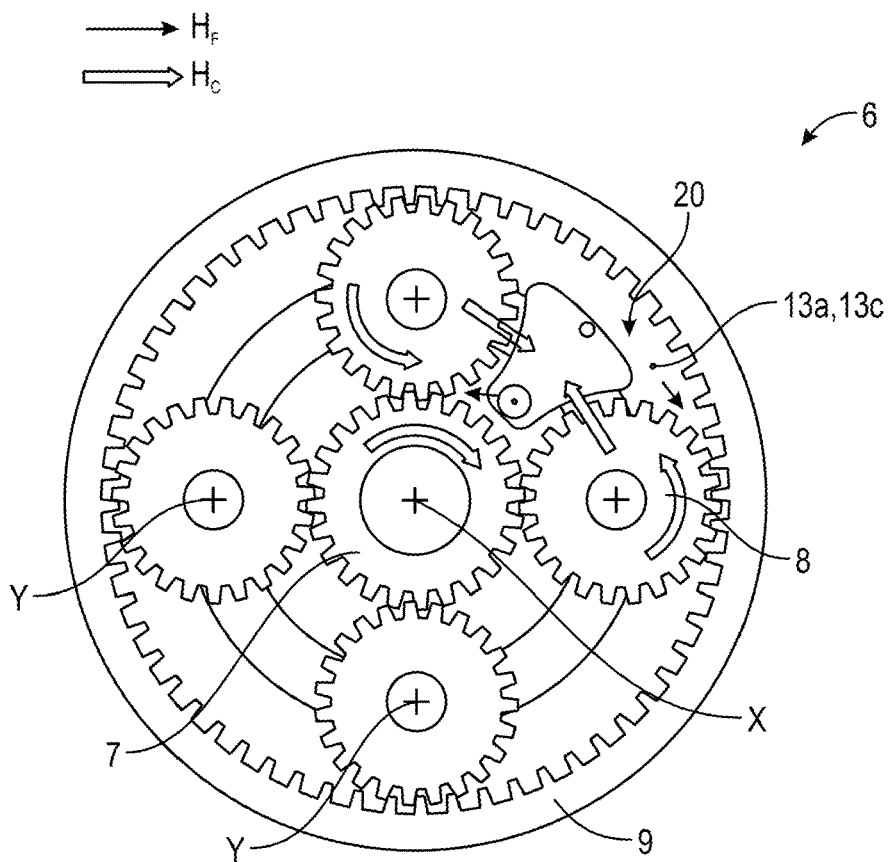
FIG. 3 is a schematic cross-sectional view of a mechanical reduction gear.

The arrows in FIG. 2 describe the oil flow in the reduction gear 6. The oil enters the reduction gear 6 from the stator part 5 into the distributor 13 by various means which will not be specified in this view as they are specific to one or more types of architecture. The distributor is separated into 2 parts, each of which is usually repeated with the same number of planet gears. The injectors 13a have the function of lubricating the toothing and the arms 13b have the function of lubricating the bearings. The oil is brought to injectors 13a to go out by ends 13c in order to lubricate by the so-called cold oil ($H_F$) the toothing of the planet gears 8, of the sun gear 7 and also of the ring gear 9 (FIG. 3). The oil is also brought to the arm 13b and circulates via the feed port 13d of the bearing. The oil then circulates through the shaft in a buffer zone(s) 10c and then flows out through the orifices 10d to lubricate the bearings of the planet gears.

Due to the centrifugal forces, so-called hot oil Hc for lubrication of the toothings is sprayed radially outwards with respect to the axes Y of the planet gears, as shown in FIG. 3. To prevent this oil from interfering with the lubrication of the adjacent planet gears 8, oil collectors 20 are arranged between the planet gears 8. Although only one oil collector 20 is shown in FIG. 3, the reduction gear comprises one collector between two adjacent planet gears and therefore comprises as many collectors as there are planet gears, i.e. four in the example shown.

Figure 4:
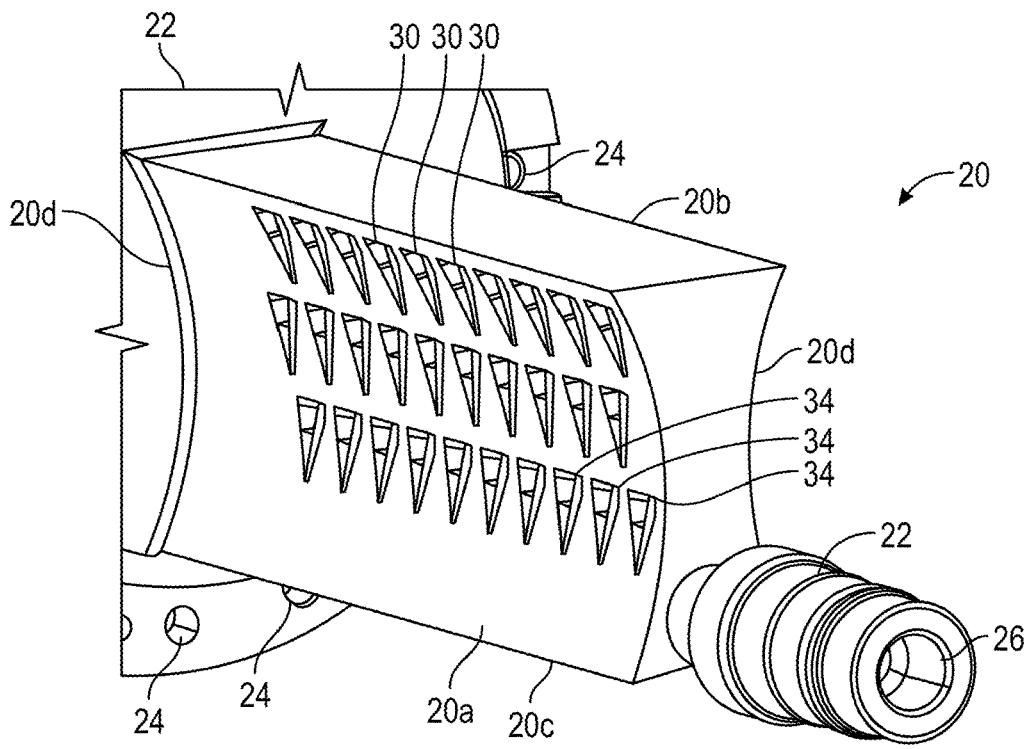
FIG. 4 is a schematic perspective view of a collector according to an embodiment of the invention.

FIG. 4 shows an example of the embodiment of an oil collector 20 according to the invention.

The collector 20 comprises a body, here in one piece, which comprises two opposite lateral faces 20a intended to extend partly around two adjacent planet gears 8. These lateral faces advantageously have a concave curved shape whose radius of curvature can be centred on the axis Y of rotation of the planet gear 8 to which this face 20a faces.

The collector 20 also comprises a top face 20b or radially outer face, here flat, intended to extend opposite the ring gear 9 or a wall of a cage in the case where the sun gear 7 and the planet gears 8 of the reduction gear 6 are arranged in a cage.

The collector 20 furthermore comprises a lower face 20c or a radially inner face, here flat, intended to extend opposite the sun gear 7.

Finally, the collector 20 comprises two faces 20d, respectively upstream and downstream. As in the example shown, one of these faces 20d can include a member 22 for fastening to the reduction gear. In the above-mentioned case of a caged reduction gear, the member 22 can be formed by a circular cover which would cover an opening of the cage for the passage and mounting of the collector in the cage. This member 22 or this cover may have orifices 24 on its periphery for the passage of screws for fastening to the cage.

The opposite face 20d of the collector 20 may comprise a common oil outlet 26 which is for example in the form of a tubular fluid connection nozzle. This nozzle can be configured to pass through a lumen in the reduction gear cage, for example.

The collector 20 also comprises an internal oil circulation cavity 28 connected to the oil outlet 26 and to oil inlets 30 located on the faces 20a.

Figure 6:
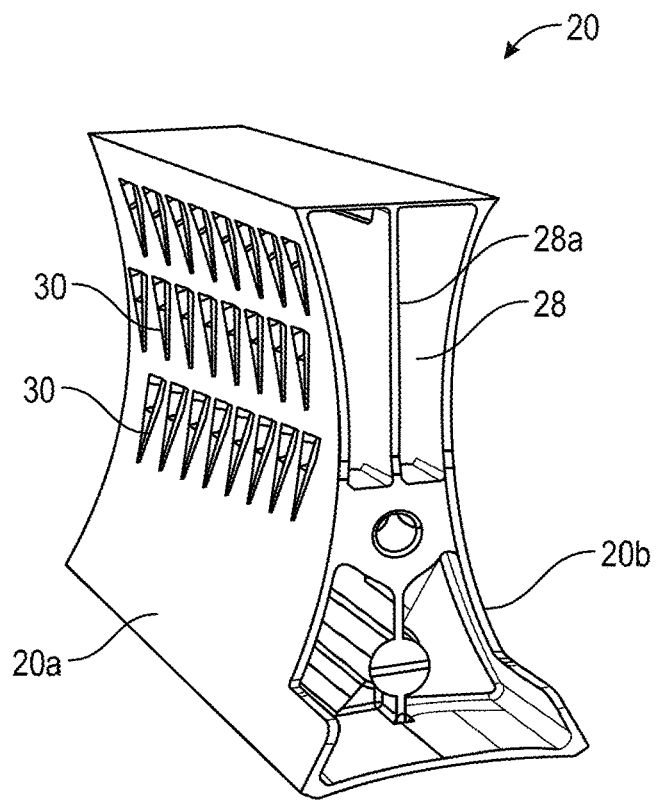
FIG. 6 is a schematic sectional view of the collector in FIG. 4.

FIG. 6 shows an example of a non-exhaustive embodiment of a collector internal cavity 28. This cavity 28 may comprise one or more spaces connected to each other.

According to the invention, the inlets 30 each have an increasing cross-section and preferably at least one wall with a hydrodynamic profile and in particular NACA, these inlets being arranged in columns and rows.

In the example shown, the collector 20 comprises on each of these faces 20a three rows of ten inlets 30 or ten columns of three inlets. There are therefore thirty inlets 30 on each of the faces of the collector 20 in this example.

Naturally, the number of rows and columns can vary depending on the dimensions of the inlets 30 and the faces 20a, for example. The number of rows is preferably greater than or equal to three. The number of columns is advantageously greater than or equal to five, and preferably greater than or equal to eight.

The inlets 30 of a row can be staggered with respect to the inlets of at least one of the adjacent rows.

In the example shown, the inlets in one row are staggered in the direction of the column arrangement with respect to the inlets in at least one of the adjacent rows. Specifically, the inlets in the even rows are aligned with each other in the direction of the column arrangement, and the inlets in the odd rows are aligned with each other in the direction of the column arrangement.

Thus, the oil flowing on the face 20a, between two adjacent inlets, can be captured and flow through the inlet disposed on the other row, between these two adjacent inlets.

Figure 5:
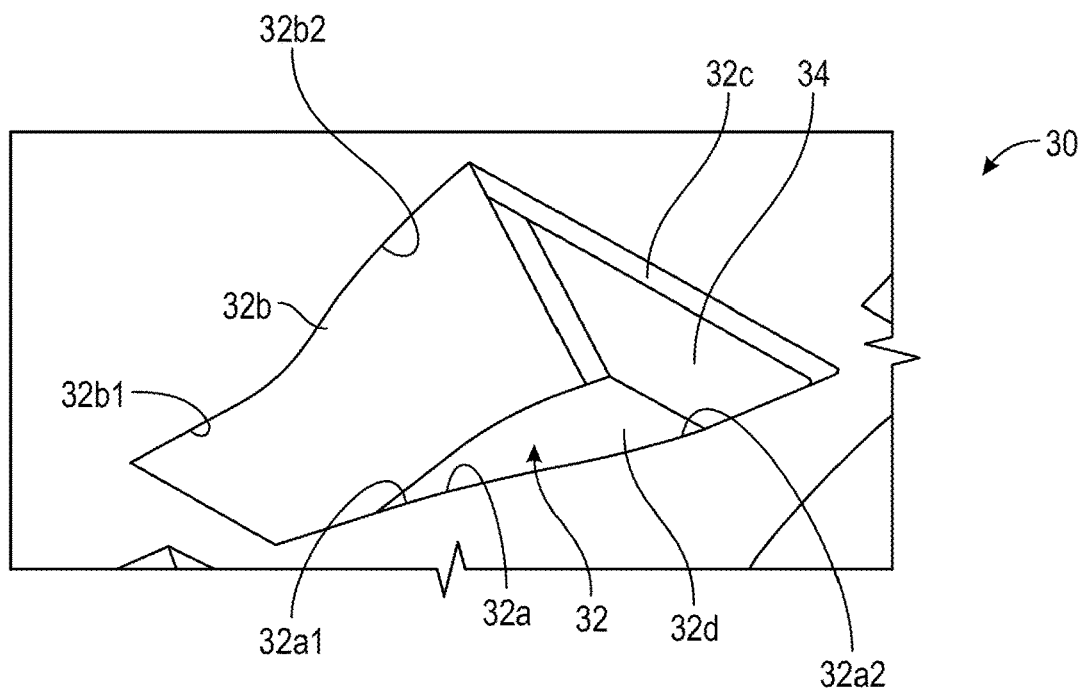
FIG. 5 is a larger scale perspective schematic view of an oil inlet of the collector in FIG. 4.
Figure 7:
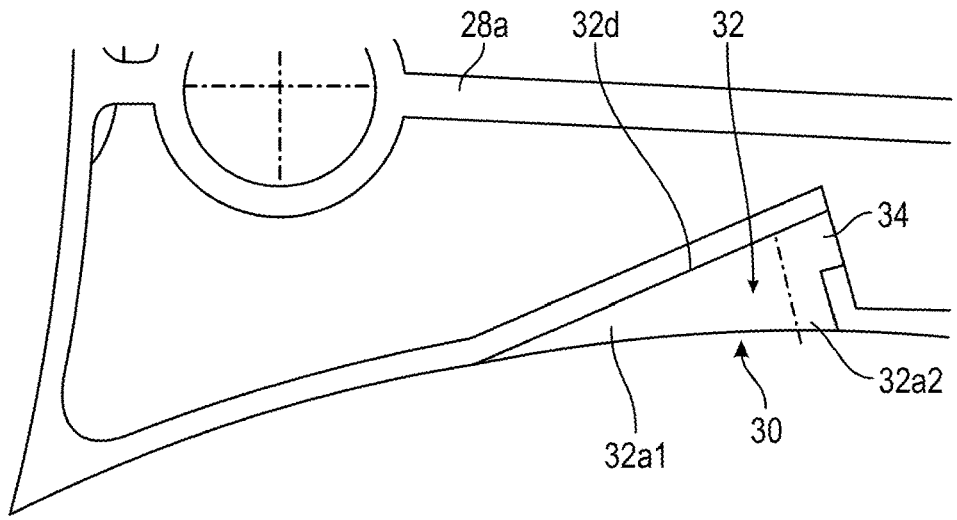
FIG. 7 is a schematic sectional view of an oil inlet of the collector.

FIGS. 5 and 7 show an inlet 30 with a larger scale.

Each of the inlets 30 comprises a recess 32 formed in the face 20a. This recess 32 is delimited by walls 32a, 32b, 32c, 32d, one of which 32c comprises an oil passage window 34 inside the cavity 28. The window 34, for example, has a general rectangular or trapezoidal shape.

The recess 32 comprises two opposing lateral walls 32a, 32b and an inclined wall 32d forming a ramp which extends between the lateral walls 32a, 32b and which is configured to convey oil from the face 20a to the wall 32c which is a bottom wall and comprises the window 34.

Figure 8:
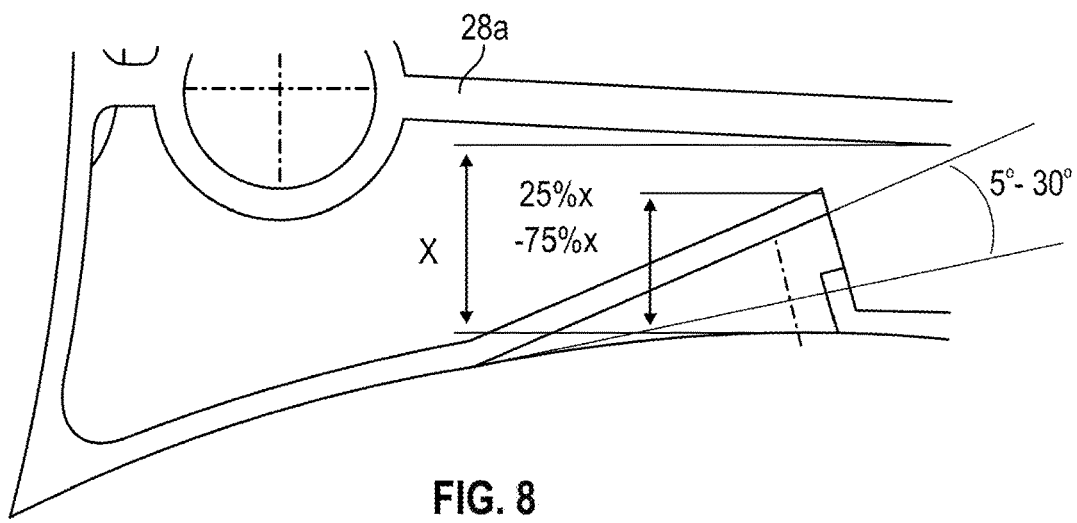
FIG. 8 is a view similar to FIG. 7 showing dimensional examples.

The wall 32d preferably has a small slope (preferably between 5 and 30°—see FIG. 8) to limit disturbance to the oil entering the recess 32. FIG. 8 gives an example of the dimensions of the recess 32. The height of the recess 32, at the level of the window 34, is between 25%. x and 75%. x when x is the height measured in the same direction between the face 20a of the collector on which the recess is located, and an internal bulkhead 28a of the collector. This bulkhead 28a is visible in FIG. 6 in particular and extends in a median plane of the collector passing between the faces 20a, 20b.

Figure 9:
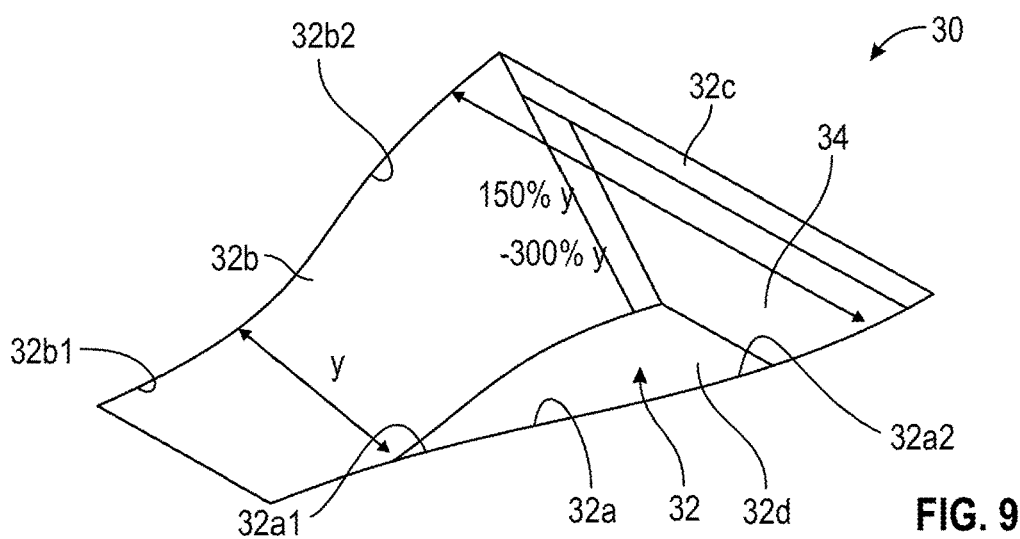
FIG. 9 is a view similar to FIG. 5 showing other dimensional examples.

As shown in FIG. 5, the lateral walls 32a, 32b diverge from each other towards the window 34 so that recess 32 has a general shape flared towards this window. The FIG. 9 gives an example of the transverse dimensions between the walls 32a, 32b of the recess 32. The transverse dimension between the portions 32a2, 32b2 is between 150%. y and 300%. y where y is the transverse dimension between the portions 32a1, 32b1.

In the example shown, it is the lateral walls 32a, 32b that have a NACA profile. They each have an evolutionary shape that is non-planar and has no edges. For example, each wall 32a, 32b comprises a first convexly curved portion 32a1, 32b1 followed by a second concavely curved portion 32a2, 32b2.

As can be seen in FIG. 4, the inlets 30 may occupy a surface area of more than 50% of the total surface area of the corresponding face 20a. It can also be seen that the walls 32c comprising the windows are located on the side of the upper face 20b of the collector.

During operation, the oil sprayed on each face 20a flows radially outwards on this face, i.e. from the face 20c to the face 20d, due to the centrifugal forces and the concave curved shape of this face. The oil can then flow into the cavity 28 of the collector 20 through the inlets 30 located on the faces 20a. The oil first flows over the inclined wall 32d and over and along portions 32a1, 32b1 of the walls 32a, 32b, then it still flows over the inclined wall and over and along portions 32a2, 32b2 of the walls 32a, 32b, and finally reaches and flows through the windows 34.

Preferably, each of the opposite lateral faces 20a comprises columns and rows of several inlets 30 each having a recess 32 with a progressively increasing cross-section.

The invention brings several advantages and in particular: reduction of losses by ventilation of the reduction gear, reduction of the temperature of the planet gears, reduction of the oil outlet temperature for the dimensioning of the exchangers, reduction of the air-to-oil ratio, etc.

The invention claimed is:

1. An oil collector for a mechanical reduction gear of a turbomachine, in particular for an aircraft, the reduction gear comprising a body comprising two opposite lateral faces each configured to extend in part around a planet gear of the reduction gear, the collector further comprising an internal oil circulation cavity connected to oil inlets located on said faces, and to at least one oil outlet, wherein at least one of said faces comprises columns and rows of several inlets each having a recess with a progressively increasing cross-section, each recess being delimited by walls, and wherein at least some of said walls have a shape that is non planar and has no edges.

2. The collector according to claim 1, wherein the number of rows is greater than or equal to three.

3. The collector according to claim 1, wherein the number of columns is greater than or equal to five.

4. The collector according to claim 1, wherein the inlets of one row are offset in the direction of the column arrangement with respect to the inlets of at least one of the adjacent rows.

5. The collector according to claim 4, wherein the inlets of the even rows are aligned with each other in the direction of the column arrangement, and the inlets of the odd rows are aligned with each other in the direction of the column arrangement.

6. The collector according to claim 1, wherein one of said walls comprises an oil passage window inside said cavity.

7. The collector according to claim 6, wherein the walls of the recess comprise two facing lateral walls and a ramp extending between the lateral walls and configured to convey the oil from the face to a bottom wall comprising said window.

8. The collector according to claim 7, wherein the lateral walls diverge from each other towards said window such that the recess has a generally flared shape towards that window.

9. The collector according to claim 1, wherein the inlets located on each of the faces occupy a surface area representing more than 50% of the total surface area of this face.

10. The collector according to claim 1 wherein each of the two opposite lateral faces comprises the columns and rows of several inlets each having a recess of progressively increasing cross-section, each recess being delimited by walls, at least some of said walls having a shape that is non planar and has no edges.

11. A mechanical reduction gear for a turbomachine, in particular for an aircraft, comprising a sun gear, a ring gear extending around the sun gear, planet gears meshed with the sun gear and the ring gear, and collectors according to claim 1 arranged between the planet gears.

12. A turbomachine, in particular for an aircraft, comprising a mechanical reduction gear according to claim 11.

13. The collector according to claim 1, wherein the number of columns is greater than or equal to eight.

14. An oil collector for a mechanical reduction gear of a turbomachine, in particular for an aircraft, the reduction gear comprising a body comprising two opposite lateral faces each configured to extend in part around a planet gear of the reduction gear, the collector further comprising an internal oil circulation cavity connected to oil inlets located on said faces, and to at least one oil outlet, wherein at least one of said faces comprises columns and rows of several inlets each having a recess with a progressively increasing cross-section, each recess being delimited by walls, and wherein at least some of said walls have a ramp with a slope of less than 20%.

* * * * *